(12) United States Patent
de Laubier et al.

(10) Patent No.: US 7,866,359 B2
(45) Date of Patent: Jan. 11, 2011

(54) ASSEMBLY DRUM INTENDED FOR THE MANUFACTURE OF SELF-SUPPORTING TIRES

(75) Inventors: Antoine de Laubier, Riom (FR); Benoît Delbecque, Clermont-Ferrand (FR); Daniel Macheffe, Veyre-Monton (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 932 days.

(21) Appl. No.: 11/788,158

(22) Filed: Apr. 19, 2007

(65) Prior Publication Data

US 2007/0246164 A1 Oct. 25, 2007

(30) Foreign Application Priority Data

Apr. 21, 2006 (FR) .................................. 06 03695

(51) Int. Cl.
*B29D 30/24* (2006.01)
*B29D 30/20* (2006.01)

(52) U.S. Cl. ..................... 156/415; 156/117; 156/133; 156/414; 156/417

(58) Field of Classification Search ............... 156/117, 156/133, 414, 415, 417
See application file for complete search history.

(56) References Cited

U.S. PATENT DOCUMENTS

| | | | | |
|---|---|---|---|---|
| 3,476,633 A | * | 11/1969 | Henley | 156/415 |
| 3,737,276 A | * | 6/1973 | Hill et al. | 425/388 |
| 4,131,500 A | * | 12/1978 | Wilde et al. | 156/131 |
| 4,151,035 A | * | 4/1979 | Jellison | 156/415 |
| 4,229,246 A | * | 10/1980 | Vanderzee | 156/417 |
| 2002/0088551 A1 | | 7/2002 | Beck et al. | |
| 2005/0098324 A1 | * | 5/2005 | Gano | 166/384 |

FOREIGN PATENT DOCUMENTS

| | | | |
|---|---|---|---|
| EP | 0 634 266 A2 | | 1/1995 |
| EP | 0624266 | * | 1/1995 |
| EP | 1 295 703 A2 | | 3/2003 |
| EP | 1 512 524 A1 | | 3/2005 |

* cited by examiner

*Primary Examiner*—Richard Crispino
*Assistant Examiner*—Martin Rogers
(74) *Attorney, Agent, or Firm*—Cohen Pontani Lieberman & Pavane LLP

(57) ABSTRACT

Assembly drum of variable diameter D, intended for the manufacture of a tire blank, the drum having a generally cylindrical laying surface (2) provided with circular grooves (3) arranged axially in a zone intended to receive profiled elements of great thickness, said groove (3) containing elastic circumferential bodies (4). When the drum D is moved to a first laying diameter, a mechanical means moves the elastic body (4) radially apart from the bottom of the groove, so as to align the radially outer surface of the elastic body (4) with the laying surface of the drum (2).

7 Claims, 3 Drawing Sheets

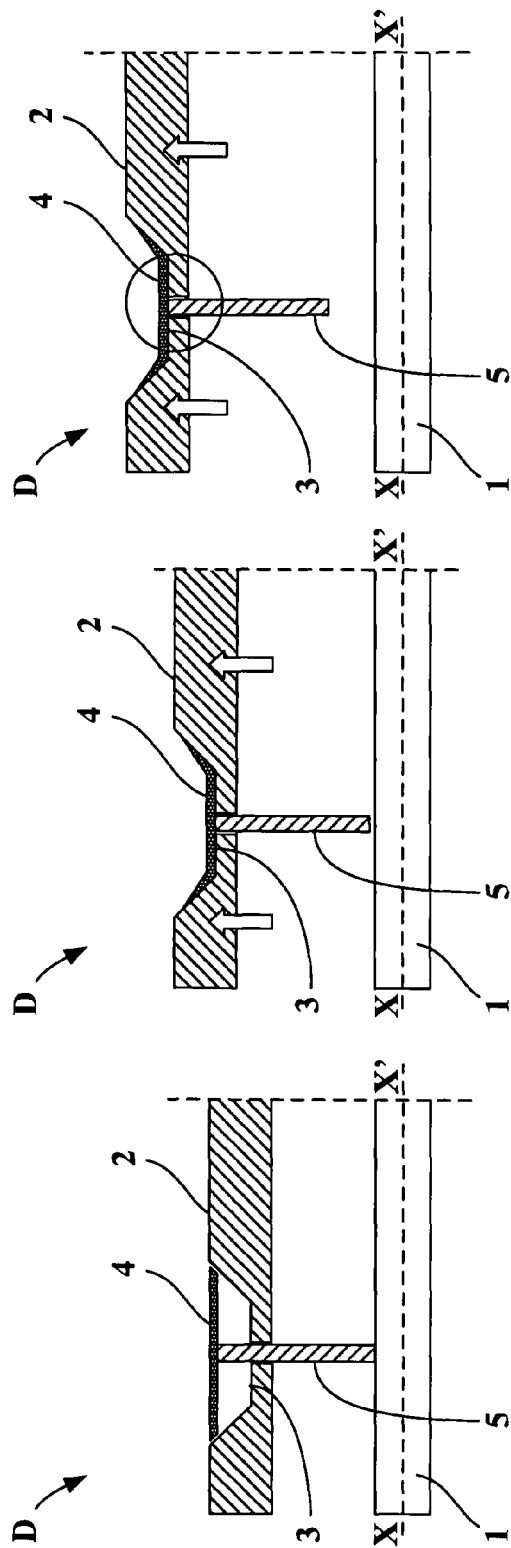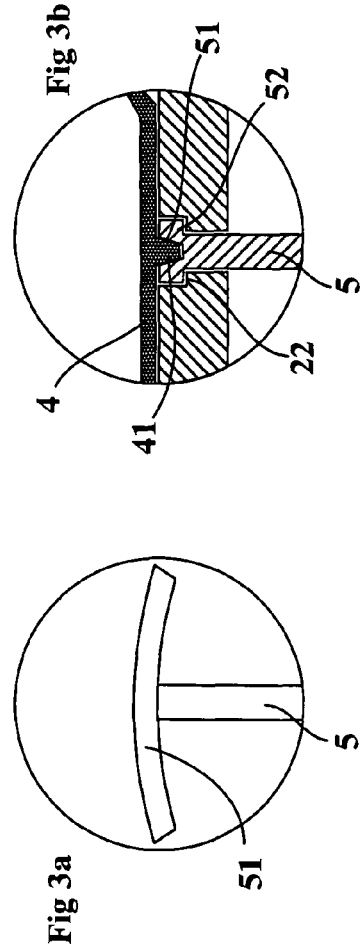

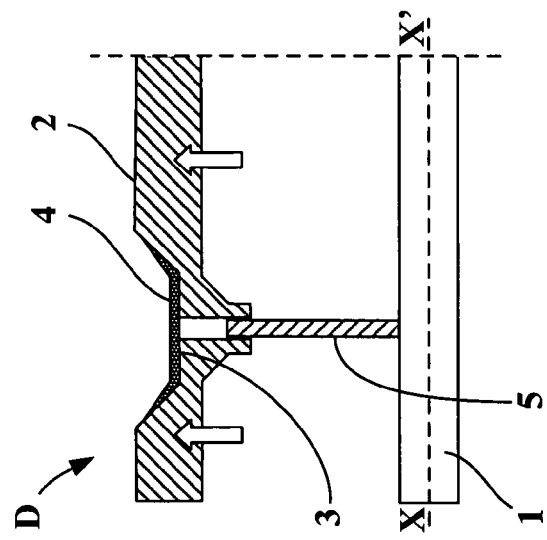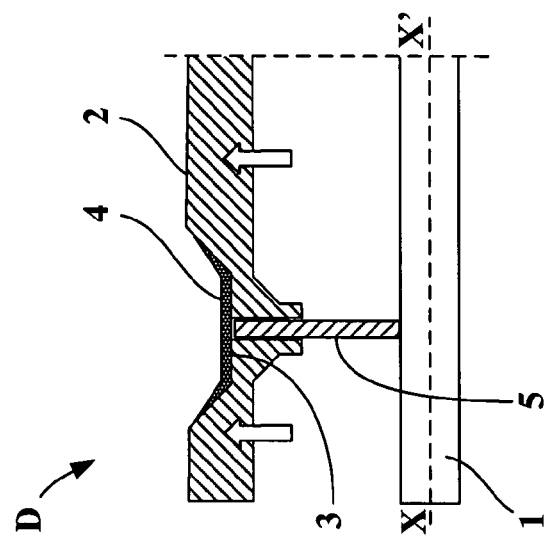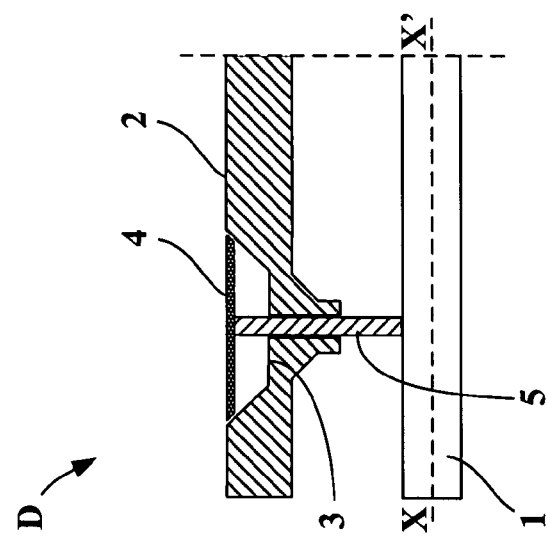

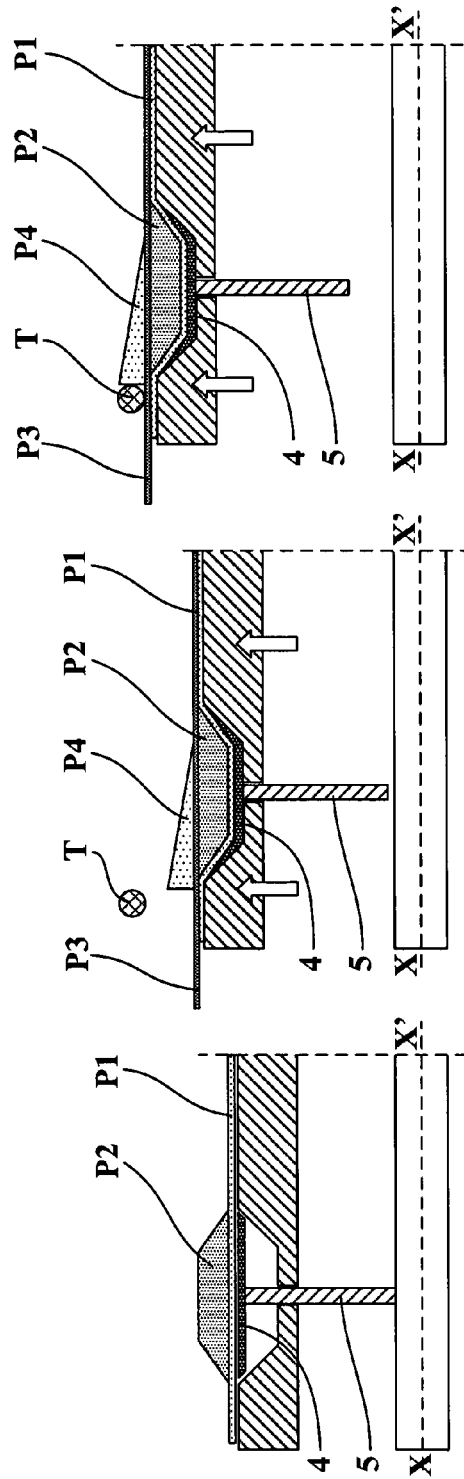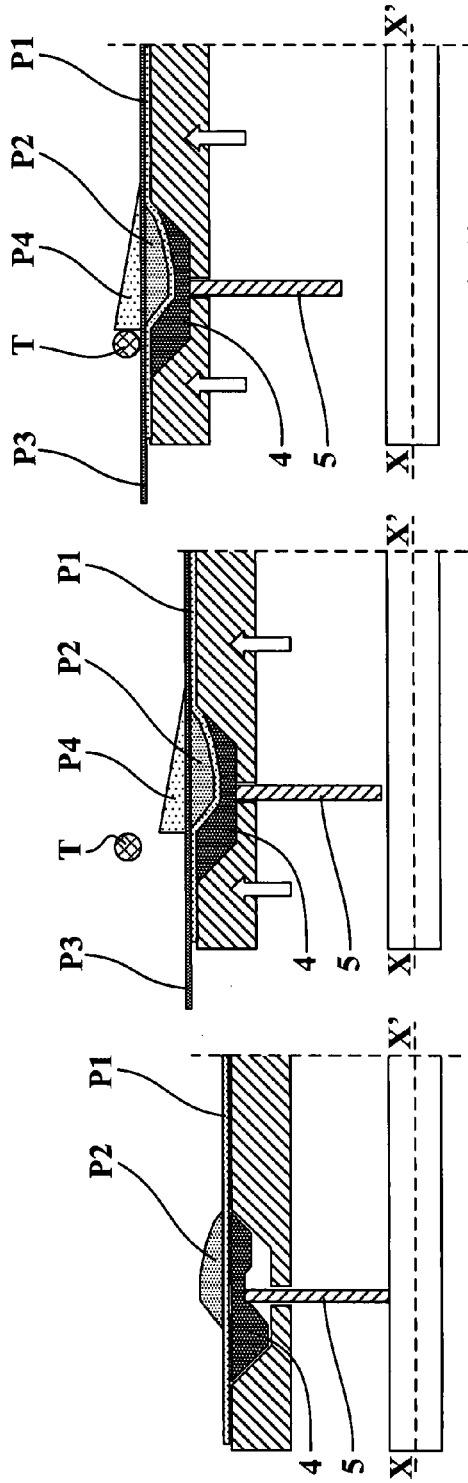

ASSEMBLY DRUM INTENDED FOR THE MANUFACTURE OF SELF-SUPPORTING TIRES

FIELD OF THE INVENTION

The invention relates to assembly drums intended in particular for the manufacture of what are called self-supporting tires. These tires enable the user to continue travelling for a certain distance when the pressure within the tire is reduced or zero.

BACKGROUND OF THE INVENTION

The construction of these tires is characterised by the fact that they comprise rubber profiled elements of great thickness arranged in the sidewalls, and generally placed between the inner liner and the carcass reinforcement ply (plies). The function of these products is to bear the load when the pressure of the air in the tire is no longer such as to be able to perform this function.

Due to this arrangement, the construction of this type of tire requires particular arrangements to provide a correct join between the different profiled elements, and all the arrangements must be made so as to avoid trapping air between the different profiled elements, in particular when a cylindrical drum is used.

This is because, when laying the profiled elements of great thickness at the axial location corresponding to the zone of the sidewalls, it is observed that the meridian profile acting as a receiving surface for the carcass reinforcement ply is relatively distorted. The effect of this is to promote air becoming trapped between the carcass reinforcement ply and the profiled elements located radially below.

One solution which makes it possible to solve this problem was proposed in publication EP 634 266.

Grooves are arranged on the receiving surface of the drum, and are spaced axially apart so as to be positioned substantially below the zone of laying the profiled elements of great thickness. In this manner, by appropriately determining the shape of the groove, it becomes possible to obtain a substantially cylindrical laying surface for the carcass reinforcement ply. The profiled element of great thickness closely follows the profile of said groove such that its radially outer surface is substantially aligned with the generally cylindrical outer surface of the assembly drum.

Still in accordance with the publication EP 634 266, and when an assembly drum of variable diameter is used, the groove may contain circumferentially arranged membranes or elastic bodies. The shape of the membrane or the elastic body is adapted to impart to the drum a generally cylindrical external profile when the drum is positioned at its first laying diameter and said membrane is inflated or the elastic body is not subjected to any elastic stress. This particular arrangement makes it possible to fill the depression formed by the groove when the inner liner and the profiled element of great thickness are laid, and makes it possible to lay said profiled elements on a drum having a generally cylindrical shape.

The following profiled elements are generally laid once the drum has been moved to a second laying diameter. During this operation, the membrane or the elastic body is compressed under the effect of the elastic forces and is flattened against the bottom of the groove. The profiled element of great thickness and the inner liner then lie closely against the new profile of the groove.

Things are arranged so that, at the end of this first shaping, the radially outer surface of the profiled element of great thickness is aligned with the laying surface of the drum to form a receiving surface which is again generally cylindrical, so that the carcass reinforcement ply can then be laid on a surface devoid of zones liable to trap air.

The assembly operations can then be continued entirely conventionally in a manner known to the person skilled in the art, which consists of depositing for example the heel filling rubber and the heel reinforcement rings, then expanding the drum a second time up to a third laying diameter so as to anchor the heel reinforcement rings, and to permit the upturn of the ends of the carcass reinforcement ply to be turned up around the heel reinforcement rings.

However, developing the membranes or the elastic bodies has proved particularly difficult in obtaining a stable laying surface when the drum is positioned at the first laying diameter. This is because it is observed that the effect of the laying tension of the profiled element of great thickness being applied to the receiving surface located axially in line with the elastic body is to compress said elastic body and to modify substantially the laying diameter.

Furthermore, when it is desired to obtain a groove having a specific meridian profile, matched to the transverse profile of the profiled element of great thickness or alternatively when it is desired to modify the axial distance between the heel reinforcement rings it is necessary to make dimensional adaptations which require accurate adjustment of the aforementioned elastic restoring forces and hence of the materials used for producing the elastic bodies.

SUMMARY OF THE INVENTION

One object of the invention is to provide an improvement to the type of drum as described above, so as to solve the problem posed.

This and other objects are attained in accordance with one aspect of the invention directed to an assembly drum of variable diameter having a generally cylindrical laying surface provided with circular grooves arranged axially in a zone intended to receive profiled elements of great thickness. Said grooves contain circumferential elastic bodies. When the drum is moved to a first laying diameter, a mechanical means moves the elastic body away from the bottom of the groove so as to align the radially outer surface of the elastic body with the laying surface of the drum.

In this manner, it is possible to become free of the radial deformation forces linked to the laying tension of the profiled elements arranged radially in line with the elastic body and thus to avoid any undesired change in the laying diameter.

By using substantially incompressible elastic materials to produce the elastic bodies, it is possible to control with high accuracy the external profile of the elastic body when the drum is positioned at a second laying diameter, greater than the first laying diameter, and the elastic body is flattened against the bottom of the groove, such that the radially outer surface of the profiled element of great thickness forms a generally cylindrical surface with the surface of the drum.

BRIEF DESCRIPTION OF THE DRAWINGS

FIG. 1 depicts a diagrammatic view in meridian section of an assembly drum according to the invention positioned at its first laying diameter, FIG. 2 depicts a diagrammatic view in meridian section of an assembly drum according to the invention positioned at a second laying diameter, FIG. 3 depicts a diagrammatic view in meridian section of an assembly drum according to the invention positioned at a third laying diameter, The detail views 3*a* and 3*b* depict an axial diagrammatic view in meridian section of a rod head.

FIGS. 4, 5 and 6 depict a diagrammatic view of an alternative mounting of the rods, FIGS. 7, 8 and 9 and also FIGS. 10, 11 and 12 illustrate diagrammatically two laying sequences for the profiled products intended to produce a tire blank, in which the elastic bodies have different profiles.

DETAILED DESCRIPTION OF THE DRAWINGS

FIG. 1 depicts a meridian section through the demi-half of an assembly drum D of axis of rotation XX'. This drum comprises a laying surface 2 of generally cylindrical form. A circumferential groove 3 is formed at each of the axial ends of the drum, at the location intended to receive said profiled products of great thickness.

The drum is driven in rotation by a motorised assembly (not shown) by means of a shaft 1.

A set of rods 5, sliding freely in the radial direction relative to the mechanical elements forming the surface of variable diameter of the drum, are connected by one of their ends [to] the radially inner circumference of a circumferential elastic body 4, and bear via the other end on the outer surface of the shaft 1, which acts as a circumferential stop intended to limit the stroke of the rod towards the inside of the drum D.

The rods are placed, at a given spacing from each other, over the entire circumference of the elastic body 4.

The length of each of the rods is adjusted such that, when the drum is positioned at the first laying diameter as illustrated in FIG. 1, on one hand the rod bears on the circumferential stop formed by the shaft 1 of the drum D, and on the other hand the radially outer surface of the elastic body 4 is located at the same diameter as the laying surface 2 of the drum D.

At this first laying diameter, the elastic body 4 is subjected to slight tension so as to maintain contact between the head of the rod 52 and to bring about the contacting of the rods 5 with the circumferential stop 1.

FIG. 2 depicts the drum positioned at a second laying diameter, greater than the first laying diameter. In this configuration, the rod 5 loses contact with the circumferential stop 1 and the elastic body 4 is drawn, under the action of the elastic forces, towards the bottom of the groove 3, against which it becomes flattened.

The radially outer surface of the elastic body is located below the cylindrical surface 2 and forms a hollow, the profile of which is dependent on the specific shape of the groove 3 and the elastic body 4.

An additional extension of the diameter of the drum, as illustrated in FIG. 3, does not involve significant displacement of the elastic body, which remains flattened against the bottom of the groove 3. The rod 5 remains suspended from the elastic body to which it is joined.

The elastic body 4 is formed of a generally rubbery material, reinforced if necessary by one or two deformable crossed plies or alternatively by a 90° ply, placed on the radially outer surface of said elastic body with the aim of stiffening this surface and distributing the forces, when the drum is positioned at the first laying diameter.

The connection between the elastic bodies and the rods may be produced very simply, so as to permit the changing of the elastic body without causing any major disruption of the production cycle, as illustrated by the detail views 3*a* and 3*b* of FIG. 3.

The rod 5 comprises, at its end cooperating with the elastic body, a head 51 suitable for lying in a receptacle 22 formed in the bottom of the groove 3, as illustrated in the detail view 3*b*.

This specific mounting configuration makes it possible to limit the radial stroke of the rod when it is no longer in contact with the circumferential stop 1. The connection between the head of the rod and the elastic body is produced by simply fitting a protuberance 41 arranged on the elastic body 4 into a groove 51 formed in the head 52 of the rod 5.

The placing and laying of the elastic body 4 can thus be carried out like the placing and laying of a single elastic sleeve which can just be moved axially into position by taking advantage of the elasticity of the material. Once in place, the protuberances 41 are positioned in the grooves 51 so as to control the axial position of the elastic body. The contact between the head of the rod and the elastic body is brought about by tensioning the elastic body, the effect of the outcome of which is to exert radial compressive forces which are applied to the heads of the rods.

The detail view 3*a* illustrates an axial view of the rod 5 in which the head 51 of the rod forms a circumferential sector, the radius of which is substantially equal to the radius of the drum when the drum is positioned at the first laying diameter, such that the elastic body is supported over the major part of its circumference when the drum is positioned in this first configuration.

One alternative construction consists of making the rods 5 integral with the circumferential stop 1, as illustrated in FIGS. 4, 5 and 6.

In this configuration, the rod slides relative to the mechanical elements defining the surface 2 of the drum of variable diameter and comes into contact with the radially inner circumference of the elastic body 4 when the drum is positioned at the first laying diameter.

In this specific arrangement, it is also possible to improve the contact between the rod heads and the elastic body by connecting said rod heads by means of a circumferential ring (not shown).

FIGS. 7, 8 and 9 and also FIGS. 10, 11 and 12 illustrate a laying sequence for the rubber profiled elements which results in a tire blank being produced.

The drum is positioned at the first laying diameter as illustrated in FIG. 7 or alternatively in FIG. 10. In this configuration, the surface of the drum and of the elastic body 4 have a generally cylindrical shape.

The inner liner P1 is laid, followed by the profiled element of great thickness P2. The profiled element P2 is arranged in line with the groove 3. The surface of the elastic body 4 is kept at the diameter of the surface of the drum by the rods 5 which lie on the circumferential stop 1. The pressure forces exerted by the laying tension of the profiled element P2 are taken up by the rods and transmitted to the circumferential stop 1.

When the drum is positioned at the second laying diameter, the elastic body 4 is flattened against the bottom of the groove 3, thus freeing a volume in which the profiled element of great thickness P1 becomes lodged, as illustrated in FIGS. 8 and 11. Comparing these two figures, it is observed that it is possible to adapt the transverse profile of the elastic body so that the radially outer surface of the profiled element of great thickness P2 is arranged at the same diameter as the cylindrical surface of the drum 2.

At this stage, the carcass reinforcement ply P3 and also the profiled filler element for the heel P4 are deposited. The heel reinforcement ring is pre-positioned using a suitable means known to the person skilled in the art.

The carcass reinforcement ply P3 is laid on a substantially cylindrical surface, which makes it possible to prevent air from being occluded between the reinforcement ply P3 and the inner liner P1.

It is noted that it is also possible to vary the axial position of the heel reinforcement ring and that of the profiled elements, by judiciously adapting the shape of the transverse profile of the elastic body 4. This arrangement is very useful when it is desired to produce tires having varied lengths between heels.

The aim of the third variation in diameter is to anchor the heel reinforcement ring as illustrated in FIGS. 9 and 12.

The finishing of the building of the carcass blank then continues in an entirely conventional manner, as has already been stated further above, by turning up the carcass reinforcement ply around the heel reinforcement rings, then by laying the profiled elements intended to form the sidewall of the tire.

The manufacturing sequences are identical when a drum of the type illustrated in FIGS. 4, 5 and 6 is used.

Furthermore, the manufacturing sequences serving to illustrate the method of operation of the drum according to the invention are based on a relatively simple tire construction. It is easy to understand that a drum according to the invention is also suited to the production of more complex architectures such as tires comprising several superposed carcass reinforcement plies with one or more profiled elements of great thickness P1, (P'1, not shown).

The invention claimed is:

1. An assembly drum of variable diameter D for the manufacture of a tire blank, the assembly drum comprising:

a plurality of mechanical elements defining a substantially cylindrical laying surface of the assembly drum, the laying surface being provided with circular grooves arranged axially in a zone intended to receive profiled elements of a thickness (P2), said grooves containing elastic circumferential bodies capable of exerting a radial compressive force, and a plurality of mechanical rods distributed circumferentially and the lengths of which are adjustable such that, when the drum D is moved to a first laying diameter, two ends of each said mechanical rods butt up respectively against a circumferential stop of a constant diameter and a radially inner surface of a respective elastic circumferential body of said elastic circumferential bodies, and move the respective elastic circumferential body radially apart from a bottom of the respective circular groove, so as to align a radially outer surface of the respective elastic circumferential body with the laying surface of the drum.

2. The assembly drum according to claim 1, in which the respective elastic circumferential body is flattened against the bottom of the respective groove under the effect of the radial compressive force when the drum is positioned at a laying diameter greater than said first laying diameter.

3. The assembly drum according to claim 2, in which a transverse profile of the respective elastic circumferential body is determined such that, when the drum is positioned at a second laying diameter, greater than the first laying diameter, and the respective profiled element of great thickness (P2) is arranged on the assembly drum, the radially outer surface of said respective profiled element (P2) forms a generally cylindrical surface with the cylindrical laying surface of the drum.

4. The assembly drum according to claim 2, in which the respective elastic circumferential body is substantially incompressible.

5. The assembly drum according to claim 1, in which the mechanical rods have rod heads forming a circumferential sector.

6. The assembly drum according to claim 1, in which the mechanical rods and the mechanical elements forming the surface of variable diameter slide freely relative to one another.

7. The assembly drum according to claim 1, in which the mechanical rods are integral with a circumferential stop.

* * * * *